April 14, 1959  C. PAQUOT ET AL  2,882,293
METHOD OF RECOVERY OF NITRIC ACID AND EXTRACTION OF ORGANIC
COMPOUNDS FROM MIXTURES RESULTING FROM NITRIC OXIDES
AND NITRATION REACTIONS
Filed July 12, 1956  3 Sheets-Sheet 1

INVENTORS
CHARLES PAQUOT
ROGER PERRON
BY
ATTORNEYS

INVENTORS
CHARLES PAQUOT
ROGER PERRON
BY
ATTORNEYS

United States Patent Office 2,882,293
Patented Apr. 14, 1959

2,882,293

METHOD OF RECOVERY OF NITRIC ACID AND EXTRACTION OF ORGANIC COMPOUNDS FROM MIXTURES RESULTING FROM NITRIC OXIDES AND NITRATION REACTIONS

Charles Paquot, Paris, and Roger Perron, Chatenay-Malabry, France, assignors to Centre National de la Recherche Scientifique, Paris, France, a corporation of France Application July 12, 1956, Serial No. 597,448

Claims priority, application France July 13, 1955

3 Claims. (Cl. 260—466)

In a general way, the action of nitric acid or of sulpho-nitric or phospho-nitric mixtures on organic substances leads, after the reaction, to a product which mainly comprises the desired derivative of the organic substance, the excess of reagents employed, a certain quantity of water and organic impurities resulting from the secondary reactions which almost invariably accompany the main reaction.

In accordance with the standard method, the final product of the reaction is precipitated in water, which has the effect of rendering insoluble the majority of the organic substances. The aqueous solution which contains the excess of nitric acid or of sulpho-nitric or phospho-nitric mixture employed is subjected to exhaustion by means of a solvent of the organic substance, insoluble in water, and there is obtained the solution of the organic substance in the solvent and residuary liquids mainly containing nitric acid or the sulpho-nitric or phospho-nitric mixture, in a dilute state.

The solvent phase which contains the organic substance is neutralised, if this is necessary, washed with water, dried and subjected to distillation with a view to recovering the solvent on the one hand and the organic material on the other hand.

The residuary liquids are passed to waste or are treated with the object of recovering the nitric acid and the sulphuric acid or phosphoric acid as the case may be. But these reagents are present in a dilute state and, by reason of this dilution, their recovery makes necessary, in particular, a large and costly apparatus and high costs of extraction which make this recuperation very expensive.

The present invention has for its object a method and an apparatus for the treatment of products resulting from the action of nitric acid or of sulpho-nitric or phospho-nitric mixtures on various organic substances, and it especially permits of the recovery under economic conditions, on the one hand of the desired organic product and, on the other hand and separately, of the nitric acid and sulphuric acid or phosphoric acid employed.

The method has the following essential features:

The whole of the products of the reaction of oxidation and/or nitration is treated in the liquid phase by a solvent having the following properties:

(a) It is capable of dissolving the organic compounds employed;

(b) It is stable with respect to water, to nitric acid, and to sulphuric or phosphoric acid, considered separately or in mixtures, under the conditions of the treatment concerned;

(c) It is miscible, at least in part, with nitric acid;

(d) It is non-miscible, or only slightly miscible, with sulphuric acid or phosphoric acid and with water.

The result of this treatment is a liquid which comprises two phases. One phase comprises the solvent, the organic products and a more or less considerable quantity of nitric acid. The other phase contains essentially sulphuric acid or phosphoric acid, water and nitric acid. The liquid is decanted. The first phase is subjected to distillation with a view to the recovery, on the one hand of the desired organic products, and on the other hand of the solvent and the nitric acid. In order to reduce the destruction of the organic compounds to negligible proportions, a solvent will preferably be chosen which has a comparatively low boiling point, for example less than 80° C., and if necessary, the present operation will be carried out under reduced pressure.

In the cases in which the solvent gives a positive azeotrope with nitric acid, this azeotrope is treated, preferably in the vapour phase, with sulphuric acid, and there is obtained the pure solvent and a sulpho-nitric mixture. The latter is distilled by known means, and there is obtained sulphuric acid free from water, which is re-cycled, and pure nitric acid, which is re-employed for nitration or oxidation reactions.

In the case in which the solvent does not give an azeotrope with nitric acid, the foregoing distillation should first separate-out the nitric acid and then the solvent, otherwise the organic materials would be put into contact with hot nitric acid of a higher and higher degree of concentration and would be liable, in consequence, to be destroyed.

The second phase is distilled with a view to recovery of the sulphuric or phosphoric acid and the nitric acid.

Amongst the solvents which have the properties indicated above, there are included the saturated aliphatic halogenated compounds, and especially chloroform.

Without this being capable of construction as a limitation of the invention, a description of the invention will now be given in greater detail with reference to the particular case in which the solvent employed is chloroform in the presence of nitric or sulpho-nitric mixtures.

As has already been stated, the method which forms the object of the invention employs the properties of miscibility of liquids with respect to each other, the values of the coefficients of distribution of certain of these liquids between two non-miscible liquid phases, and also the characteristics of the equilibrium between these liquids and their vapours.

For the sake of clearness, and before giving details of the operations, an indication will be given of a few experimental results obtained by the inventors. For this purpose, reference will be made to the attached drawings in which:

Fig. 1 shows the curve giving the distribution of nitric acid between water and chloroform;

Fig. 2 gives the curve representing the distribution of nitric acid as between sulphuric acid and chloroform;

Fig. 3 gives the curves of liquid-vapour equilibrium of the chloroform-nitric acid system;

Figure 1:
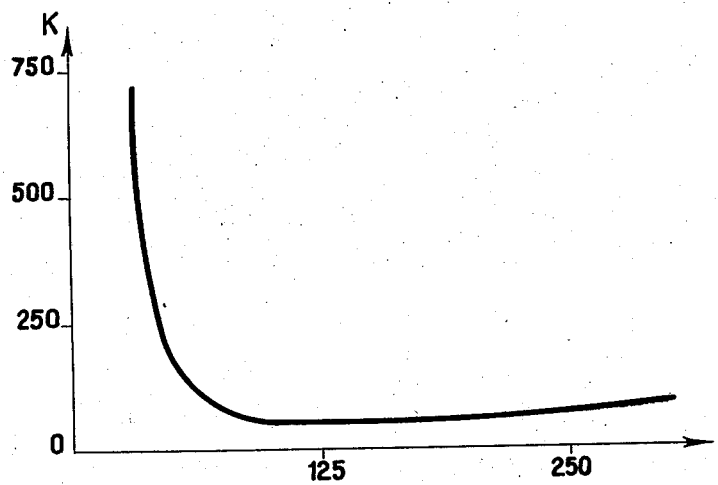

In order to produce the diagram of Fig. 1, the case was considered of nitric acid in equilibrium with a system formed by water and chloroform, in liquid phases, at the ambient temperature. There have been plotted as abscissae the total quantity of nitric acid evaluated in grams contained in a system formed by 50 grams of water and 50 grams of chloroform. As ordinates, there have been plotted the values of the ratio K which is defined as follows:

$$K = \frac{\text{Weight of nitric acid in water}}{\text{Weight of nitric acid in the chloroform}}$$

It is seen that when there is only a small quantity of nitric acid, K is large. Almost all the nitric acid is in the aqueous phase. Then, starting from a certain quantity of nitric acid, K assumes a value which is substantially constant in the vicinity of 60. This quantity corresponds approximately to an aqueous solution of nitric acid having a composition in the vicinity of that of the azeotrope water-nitric acid.

The curve cannot extend beyond a certain limit, since for high contents of nitric acid, the latter plays the part of a third solvent with the consequent disappearance of the two-phase system and the production of a single phase.

Figure 2:
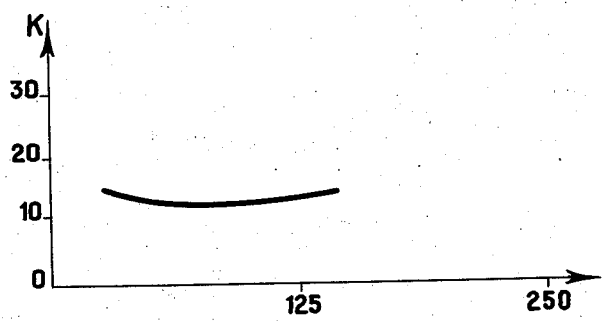

The curve shown in Fig. 2 is concerned with the chloroform-nitric acid-sulphuric acid system, and relates to the distribution of nitric acid in equilibrium with a system formed by sulphuric acid and chloroform, in liquid phases, at the ambient temperature. As abscissae, there have been plotted the total quantities of nitric acid in grams, contained in the system formed by 50 grams of sulphuric acid and 50 grams of chloroform. As ordinates, there are shown the values of the ratio K' which is defined in the following way:

$$K' = \frac{\text{Weight of nitric acid in the sulphuric acid}}{\text{Weight of nitric acid in the chloroform}}$$

This curve shows that K' is substantially constant between wide limits, which means that the nitric acid is distributed substantially in the same way between the chloroform and the sulphuric acid, whatever the quantity to be distributed may be.

As in the previous case, but this time for lower values, the nitric acid serves as a tertiary solvent with the production of a single phase system, if the quantity of nitric acid is too great.

When there is a quaternary mixture (HNO₃—H₂SO₄—CHCl₃—H₂O)

there is obtained for the distribution of nitric acid between the two cases, curves similar to those preceding and which are intercalated between them, the exact position depending on the relative concentrations of water and sulphuric acid.

Figure 3:
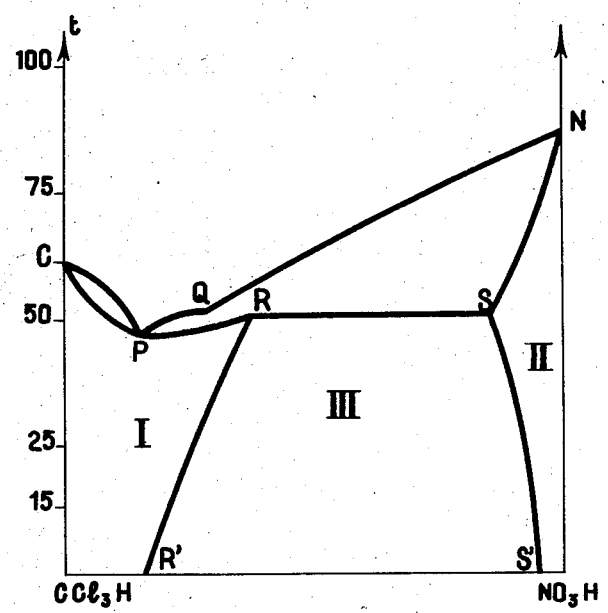

Fig. 3 represents the liquid-vapour equilibrium curves of the chloroform-nitric acid system at atmospheric pressure. As abscissae, there have been plotted the concentrations by weight of the nitric acid in the nitric acid-chloroform mixture while the temperatures are given as ordinates.

The lower limb CPRSN shows the composition of the liquid phase in equilibrium. The upper limb CPQN gives the composition of the vapour. At the point P, there is a positive homo-azeotrope having a boiling point of 47-48° C. and a composition by weight of nitric acid of about 15%.

At the point Q, there is a hetero-azeotrope having a concentration by weight of 27 to 28% of nitric acid and a boiling point of about 51° C.

At the points R and S, there is a partial miscibility at boiling, the concentrations by weight of nitric acid being respectively equal to 35% to 40% and 85% to 90%.

The curves RR' and SS' define the compositions of the saturated phases in the liquid state and in equilibrium, as a function of the temperature. For example, the phases in equilibrium at 15° have the following compositions:

A phase which is poor in nitric acid, 20 to 21% by weight;
A phase which is rich in nitric acid, 92 to 95% by weight.

The preceding curves divide the field of the liquid phases into three zones. In zone I there is a homogeneous solution of nitric acid in chloroform, in zone II a homogeneous solution of chloroform in nitric acid, in zone III, two liquid phases in equilibrium, one rich in chloroform, the other in nitric acid; as these two phases have very closely adjacent densities, they are difficult to separate.

It should be noted that in the presence of water, it is necessary to consider, in addition to the binary azeotropes (nitric acid-chloroform, nitric acid-water, and chloroform-water) the ternary azeotrope, and this latter has the lowest boiling point.

Figure 4:
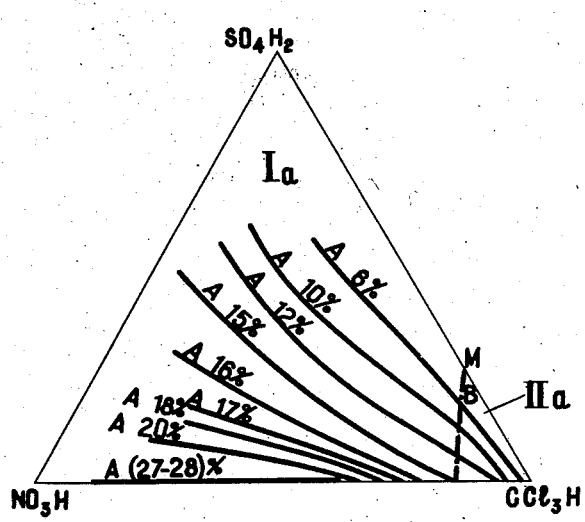
Fig. 4 is a family of curves giving the contents of nitric acid in the vapour of a chloroform-nitric acid-sulphuric acid mixture, the composition of which is given by the triangular co-ordinates of the ternary system.

The curves shown in Fig. 4 relate to the chloroform-nitric acid-sulphuric acid system at atmospheric pressure. Any particular mixture of these three constituents will be shown in triangular co-ordinates by a point of the triangle. The liquid gives off a vapour which practically contains no sulphuric acid, and the temperature of which corresponds substantially to that of the binary mixture nitric acid-chloroform of the same composition. At the moment of equilibrium, the content of nitric acid in the vapour is given by the diagram formed by the family of curves A.

Each curve A corresponds to nitric acid-sulphuric acid-chloroform mixtures giving a vapour which has the same composition by weight of nitric acid. This composition is indicated on each particular curve.

In the same way, the curve B has been drawn corresponding to mixtures for which the proportion of nitric acid and chloroform is the same in the vapour phase and in the liquid phase. This curve joins the azeotropic point of the binary CHCl₃—HNO₃ at a point M belonging to the binary CHCl₃—H₂SO₄. This curve B separates the plane of the triangle into two zones Ia and IIa. For the points situated in the zone Ia, the vapours are poorer in nitric acid than the corresponding liquid phase. It is the converse which is the case for the points of the zone IIa. It results from this observation that in order to extract nitric acid in the vapour phase from a nitro-chloroformic mixture, by the use of sulphuric acid, it is necessary to work with nitro-chloroformic solutions which are fairly concentrated in nitric acid, or to use sufficient concentrations of sulphuric acid. For an initial concentration of sulphuric acid greater than that corresponding to the point M, all the sulpho-nitro-chloroformic systems supply a vapour the content of which in nitric acid is lower than that of the initial mixture.

The method forming the object of the invention and applied in the special case in which the solvent used is chloroform, may include for example the following operations, it being understood that this description is not given in any sense of limitation.

After the reaction of oxidation and/or of nitration, the whole of the products resulting from the reaction is treated, in the liquid phases, with an excess of chloroform. Two phases are obtained, one chloroformic, the other sulphuric, containing water in some cases. The mixture is decanted. The chloroformic phase generally contains the whole of the organic products and a more or less considerable part of the nitric acid. It contains practically no sulphuric acid, which is insoluble in chloroform.

The other phase contains essentially the sulphuric acid, water and nitric acid. The distribution of the nitric acid as between the two phases is given by the curves of Figs. 1 and 2.

The chloroformic phase is subjected to distillation in order to separate from it, at the head of the column, the binary azeotrope chloroform-nitric acid at 15% of HNO₃ (see Fig. 3). The chloroform in excess then passes in the pure state. At the base of the column, there remain the organic products desired. In order to facilitate the removal of the organic products, it is sometimes preferable not to distil the whole of the chloroform and to leave behind a quantity which is sufficient to keep these products in solution.

In the exceptional case in which the mixture of the organic products contains one or a number of compounds having a boiling point less than that of chloroform, these compounds will be drawn-off from the suitable plate of the distillation column, instead of being obtained from the base of the column.

The pure chloroform is re-cycled. The whole of the nitric acid is present in the azeotrope since care has been taken to put in an excess of chloroform.

The liquid treated in this distillation should not contain water, since in that case there would be obtained a ternary azeotrope at 2% of nitric acid and about 2% of water, and not the binary azeotrope with 15% of nitric acid.

This is especially the case if working has been carried out with a sulpho-nitric mixture, since the water has been retained by the sulphuric acid during the extraction by chloroform. If an initial mixture is present which contains water and very little or no sulphuric acid, a certain quantity of the latter is added.

The nitro-chloroformic azeotrope obtained previously is treated in the vapour phase by sulphuric acid. The sulphuric acid carries off the nitric acid as is shown by the curves of Fig. 4. By working in a column which has the required number of plates, there is obtained, at the base of the column, a sulpho-nitric without chloroform (the maximum concentration in nitric acid being about 33%, corresponding to an ideal extraction carried out from the point M of Fig. 4), and, at the top of the column, chloroform vapours containing very little nitric acid (less than 1%). This chloroform is condensed and re-cycled.

The nitric-sulphuric mixture is distilled by methods well known to those skilled in the art. There is obtained sulphuric acid free of water, which is re-cycled, and pure nitric acid which can be utilised for fresh reactions of oxidation or of nitration.

The aqueous phase obtained during the initial extraction by chloroform contains water, sulphuric acid and nitric acid in proportions which vary with the nature of the reactions of nitration or of oxidation. The constituents can be recovered by distillation. There is obtained in particular a mixture $HNO_3$—$H_2O$ in the vicinity of the azeotrope.

The method which has just been described may be put into operation by the use of vessels and distilling columns of standard type; using however a judicious combination of these elements, the operations can be carried out continuously by re-cycling the chloroform and a portion of the sulphuric acid. By way of example, a possible form of construction of such an installation will be described with reference to Fig. 5, in which the various parts of the apparatus and the couplings between these parts have been shown very diagrammatically.

The whole of the products obtained from the reaction of nitration and/or of oxidation, to which sulphuric acid is added in the case in which this acid is not present in the reaction, passes through a pipe 1, into the interior of a chamber 2, into which chloroform is also passed through a pipe 3 terminating at the lower part of the chamber 2. The chloroform, which is supplied from a reservoir 4, and the products of the reaction of nitration and/or of oxidation become mixed and the entire mixture is then separated into two phases: one containing water, sulphuric acid and nitric acid, and the other being chloroformic and containing the products desired, chloroform and nitric acid. It will of course be understood that this extraction (liquid-liquid) can be repeated a number of times in order to obtain a better separation of the constituents.

The first phase is evacuated through a pipe 5 located at the bottom of the chamber 2. It will be treated by the usual methods in apparatus which has not been shown on the appended drawings.

The nitro-chloroformic phase passes out of the chamber 2 through a pipe 6 and passes into a reservoir 7. It leaves this reservoir through the pipe 8 and penetrates towards the centre of a distillation column 9. This column is heated at its lower portion, for example by a coil 10 through which is passed a liquid having a temperature of the order of 70° C. There is collected at the lower portion, at 11, the organic material which is dissolved if necessary in a small quantity of chloroform. In the region of the column at a temperature of about 61° C., the chloroform is collected and is liquefied in a condenser (not shown) and is then brought through the pipe 12 into the reservoir 4. At the upper part of the column 9, in which the temperature is in the vicinity of 48°, the azeotrope nitric acid-chloroform is collected. This azeotrope is brought, in the state of vapour, through a pipe 13 towards the lower part of a column 14 which is adapted for the exhaustion of a vapour by a liquid, this column receiving at its upper portion, sulphuric acid or a sulphonitric mixture poor in nitric acid and having the required temperature to ensure the correct working of the column, namely greater than 60° C. The liquid contained in a reservoir 15 is brought into the column 14 through a pipe 16 and comes in contact with the azeotrope vapours. It becomes loaded with nitric acid (see the curves of Fig. 4) whilst the chloroform vapours which are substantially free from nitric acid, pass out of the column through a pipe 17, and are condensed in a condenser (not shown), the resulting liquid being led into the reservoir 7 and then re-cycled. At the base of the column 14, a sulpho-nitric mixture is collected and is brought through a pipe 18 to the centre of a distilling column 19. This column, which may, when so desired, be operated under reduced pressure, is heated by a coil 20. There is collected at 21 in the upper part, pure nitric acid which may again be employed for reactions of nitration and/or of oxidation, and at the base of the column, there is collected a sulpho-nitric mixture having a low concentration of nitric acid. This mixture, the temperature of which is at least equal ot that of the sulphuric acid introduced through the pipe 16 into the column 14, is led through a pipe 22 into the reservoir 15 and is then re-cycled.

The installation may operate in a continuous manner. The chloroform follows a closed cycle, the only quantity extracted being that present at the base of the column 9 in the case in which the distillation is not carried too far in order to facilitate the extraction of the organic products. These losses are made up by supplying the required quantity of chloroform to the reservoir 4.

The sulphuric acid required for the treatment of the azeotrope and for the extraction of pure nitric acid works in a closed cycle in the columns 14 and 19. The sulphuric acid which has been used in the reaction is recovered at 5.

The nitric acid which has been employed for the reaction is recovered in two forms; at 5, mixed with sulphuric acid and in some cases with water, and at 21 in the pure state.

The installation will of course includes the valves and the pumps required for the circulation of the fluids together with the condensers and the heat exchangers required for the recovery of heat. These elements have not been shown on the attached drawings.

By way of indication and without any restrictive limitation, there will now be given examples of the results of a continuous treatment of products obtained from an oxidation reaction.

After the oxidation of methyl stearate by a sulphonitric mixture, the product which resulted had the following composition:

| | Parts by weight |
|---|---|
| Nitric acid | 153 |
| Sulphuric acid | 15 |
| Water | 25 |
| Organic substances | 21 |

In the text which follows, all the numbers represent parts by weight.

This mixture was introduced through the pipe 1 into the extraction column 2 in which it was treated with 1655 parts of chloroform obtained from the tank 4.

From the pipe 5, there passed out 93 parts of a liquid composed of 53 parts of nitric acid mixed with 15 parts of sulphuric acid and with 25 parts of the initial water. From the pipe 6, there passed out 1776 parts of a liquid composed of 21 parts of organic substances dissolved in 1755 parts of a nitric chloroform at 5.7% (100 parts of nitric acid in 1655 parts of chloroform).

As a continuous operation, this liquid was mixed in the tank 7 with a dilute nitric chloroform obtained from the column 14 by means of the pipe 17, which resulted in this tank 7 in the production of a nitric chloroform titrating an average of 4.6% of nitric acid.

The distillation column 9 was supplied with 2423 parts of liquid obtained from the tank 7, composed of 21 parts of organic materials and 2402 parts of nitric chloroform (112 parts of nitric acid and 2290 parts of chloroform). By distillation, there was obtained at the head of the column 747 parts of the nitro-chloroformic azeotrope at 15% (or 112 parts of nitric acid and 635 parts of chloroform); towards the base of the column, 164 parts of chloroform which were passed through the pipe 12 to the storage tank 4; and at the base of the column, at 11, the 21 parts of organic compounds dissolved in 10 parts of chloroform.

The nitro-chloroformic azeotrope passing out at 13 was treated in the vapour state in the washing column 14 with 250 parts of sulpho-nitric acid at 5% (237.5 parts of sulphuric acid and 12.5 parts of nitric acid) obtained from the tank 15 by means of the pipe 16. Its temperature was chosen in such manner as to ensure satisfactory operation of the column 14. There was passed out of the top of this column 647 parts of a nitric chloroform at 1.8% (635 parts of chloroform and 12 parts of nitric acid) which were condensed and conveyed to the tank 7 through the medium of the pipe 17; at the base of the column, there were obtained 350 parts of a sulpho-nitric mixture at 32% of nitric acid (237.5 parts of sulphuric acid and 112.5 parts of nitric acid), which were sent into the distillation column 19 through the medium of the pipe 18.

This distillation column 19, of a standard type, supplied at 21 at the top of the column, 100 parts of pure nitric acid, and at the base of the column 250 parts of a sulpho-nitric mixture at 5% of nitric acid (237.5 parts of sulphuric acid and 12.5 parts of nitric acid); this last mixture was passed by means of the pipe 22 to the tank 15 in order to be re-cycled.

In this apparatus, the balance sheet of the nitric acid is thus made-up as follows: for 153 parts passed in at 1, mixed with all the other products, there were found at 21, 100 parts of pure nitric acid and at 5, 53 parts of nitric acid mixed with 25 parts of water and 15 parts of sulphuric acid; this last mixture readily permitted the recovery of the nitric acid in the form of its azeotrope with water.

An alternative form of the above method, employing a slight modification in the equipment, permits of the introduction into the last distillation column 19 of a sulpho-nitric mixture which is richer in nitric acid, and which thus is more easily distilled.

Figure 5:
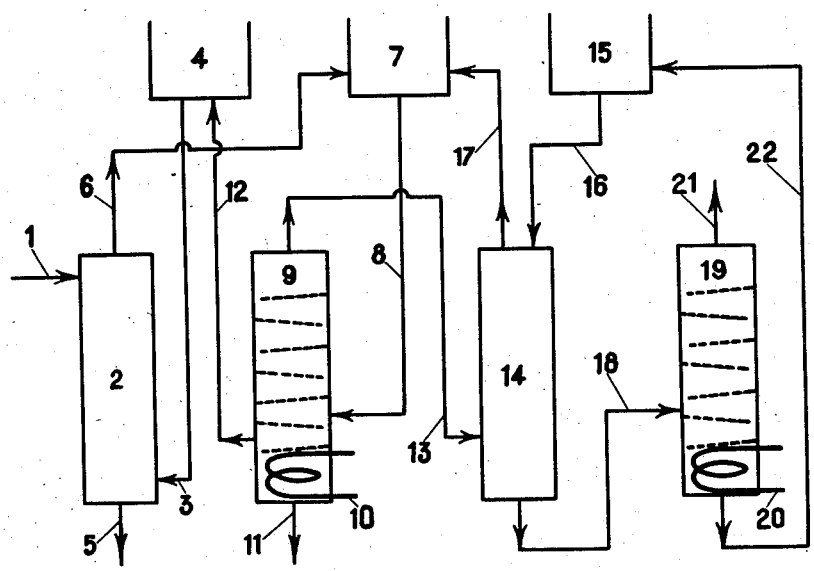
Fig. 5 is a diagrammatic drawing of one form of an installation for carrying the method of the invention into effect.
Figure 6:
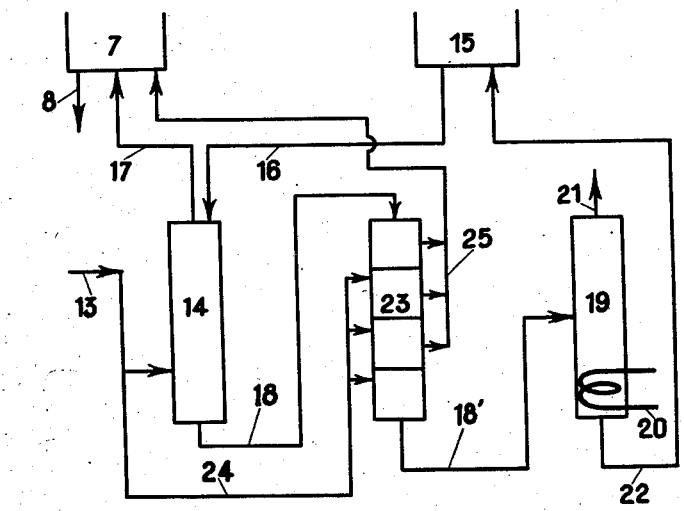
Fig. 6 shows an alternative form of installation for carrying into effect a modified type of method.

This modification is shown diagrammatically in Fig. 6 of the appended drawings, in which the same reference numbers have been retained as for Fig. 5 for the elements which are common to these two diagrams.

It is characterized by the fact that a supplementary column 23 is introduced on the pipe 18. This column comprises a certain number of plates. The liquid led in through the pipe 18 at the top of the column flows across each of the plates and passes out of the column through the pipe 18', by which it is passed to the column 19.

A fraction of the nitro-chloroformic azeotrope which was passed into the column 14 is taken off through the medium of the pipe 24 and conveyed in the state of vapour under each of the plates of this column. These vapours become poorer in nitric acid by being bubbled through the plates filled with nitro-sulphuric acid (see Fig. 4) and pass out above each of the plates, from which they are sent by means of the pipe 25 to the storage tank 7, after condensation. With a few plates, it is thus possible to obtain at 18' a nitro-sulphuric acid which can titrate more than 40% of nitric acid.

The practical advantage of this alternative is two-fold:

(1) The nitro-sulphuric acid to be distilled in the column 19 is richer in nitric acid;

(2) For the same quantity of products which are passed into the apparatus through the pipe 1, the column 14 treats a smaller quantity of the nitro-chloroformic azeotrope and can thus be of smaller dimensions, and in consequence, the quantity of sulphuric acid required for the correct working of the column 14 is reduced.

What we claim is:

1. In the process of reacting oxidizable and nitratable organic compounds with a mineral acid reagent selected from the group consisting of nitric acid, mixtures of nitric acid with sulfuric acid and mixtures of nitric acid with phosphoric acid to effect a reaction on said organic compounds, giving a reaction mass comprising reacted organic compounds and aqueous mineral acids and recovering the reacted organic compounds from the aqueous mineral acids by solvent separation, the improvement comprising the steps of adding to the reaction mass a halogenated aliphatic saturated hydrocarbon solvent whereby a solution is obtained which separates into a solvent phase containing said solvent, said reacted organic compounds and a major part of the nitric acid present and an aqueous phase containing water and the remainder of the mineral acids, separating said solvent phase from said aqueous phase, distilling said solvent phase and recovering separately said reacted organic compounds and said major part of the nitric acid free from other mineral acids and water in the form of an azeotrope with said organic solvent, treating said azeotrope in the vapor phase with liquid sulfuric acid to effect solution of the nitric acid present in said azeotrope in said sulfuric acid, distilling the sulfuric acid solution of nitric acid and separting said major part of the nitric acid in pure form.

2. The method of claim 1 in which said solvent is selected from those solvents boiling below 80° C.

3. A method as claimed in claim 1, in which said halogenated aliphatic saturated hydrocarbon solvent is chloroform.

References Cited in the file of this patent

UNITED STATES PATENTS

| | | |
|---|---|---|
| 2,032,035 | Wyler | Feb. 25, 1936 |
| 2,734,073 | Frevel et al. | Feb. 7, 1956 |
| 2,734,910 | Hinkamp | Feb. 14, 1956 |